United States Patent [19]

Michels

[11] 4,045,160
[45] Aug. 30, 1977

[54] FLAT-FLAME GAS BURNER

[75] Inventor: Norman C. Michels, Bay Village, Ohio

[73] Assignee: Lee Wilson Engineering Company, Inc., Cleveland, Ohio

[21] Appl. No.: 656,519

[22] Filed: Feb. 9, 1976

[51] Int. Cl.² ........................................... F23D 13/12
[52] U.S. Cl. .................................. 431/348; 431/347; 239/403
[58] Field of Search ............... 431/347, 348, 180, 181, 431/182, 183, 195, 197, 198, 354, 168; 239/403, 405, 406, 429, 430, 431; 110/28 B, 28 D, 28 F

[56] References Cited

U.S. PATENT DOCUMENTS

| 2,247,768 | 7/1941 | Huwyler | 431/348 X |
| 2,474,313 | 6/1949 | Hess | 431/348 |
| 2,806,521 | 9/1957 | Blaha | 431/348 |
| 3,212,554 | 10/1965 | Blaha | 431/9 |
| 3,368,605 | 2/1968 | Reed | 431/168 X |

FOREIGN PATENT DOCUMENTS 677,697  8/1952  United Kingdom ............... 110/28 D

*Primary Examiner*—Edward G. Favors
*Assistant Examiner*—Larry Jones
*Attorney, Agent, or Firm*—Bosworth, Sessions & McCoy

[57] ABSTRACT

A fuel gas burner adapted for mounting in a heat treating furnace and for generating a relatively large expanse of radiant energy toward an object to be heated or heat treated. The burner has a housing with separate inlets for fuel gas and air and an air plenum with a forwardly facing throat. Surrounding the plenum throat is a combustion block formed of refractory material shaped to define a forwardly-facing frusto-conical heat radiating surface. A central fuel gas supply tube coaxial with the plenum throat has a nozzle element and a cooperating distributor mounted on its forward end to define with the plenum throat an annular air passage and a fuel gas chamber communicating with the supply tube. The nozzle element has radially extending circumferential vanes that define with the plenum throat, swirl producing slots adapted to receive air from the plenum chamber through the annular passage and fuel gas through ports communicating with the fuel gas chamber. The resulting fuel-air mixture which has a swirling motion imparted by the slots is ignited and propelled radially outward against the frusto-conical surface of the combustion block to produce a generally flat-flame. This produces a relatively large expanse of heat radiation directed toward the area to be heated.

5 Claims, 7 Drawing Figures

FLAT-FLAME GAS BURNER

BACKGROUND OF THE INVENTION

This invention relates to direct-fired fuel gas heating or heat treating furnaces such as for annealing steel strip and especially to a burner adapted for mounting in the furnace wall for mixing and igniting fuel gas and air and for producing a swirl effect in the combustion zone that results in a flat-flame pattern. More particularly, the invention relates to direct-fired fuel gas burner construction that produces a generally flat-flame to generate a large expanse of heat radiation.

Flat-flame burners of the general type to which the present invention is directed are adapted to impart a swirling movement to a mixture of fuel, gas and air so that when ejected from the nozzle, the mixture and flame flares outwardly. As a result, the swirling gaseous mixture progresses from the nozzle at a relatively low forward velocity but with a relatively larger tangential velocity. Thus, the flame spreads outwardly in radial fashion and tends to remain close to the surface of the combustion block.

The result of the general construction described above is a wide, flat expanse of flame with sufficient turbulence for intimate mixing of fuel, gas and air and complete combustion. The combustion takes place largely in a radially extending path rather than in an axial path so that the flame extends over a wide area.

SUMMARY OF THE INVENTION

It is among the objects of the invention to produce an improved flat-flame fuel gas burner which provides an advantageous flame pattern and high heating efficiency and which may be readily modified to provide a wide range of heat output capability.

Another object of the invention is to produce a direct-fired flat-flame fuel gas burner of a less complicated construction and at a reduced cost.

A further object of the invention is to produce a flat-flame burner which can readily be modified to accommodate different gaseous fuels and/or to increase or decrease the burner capacity, i.e., output in B.T.U.'s per hour.

These and other objects and advantages are achieved with the novel burner construction of the invention which comprises a housing adapted to be supported by a sidewall of the heat treating furnace in which it is to be used and which defines an air plenum communicating with an air inlet preferably connected to a conduit that passes through the insulated wall of the furnace. The housing also has a forwardly facing cylindrical plenum throat. Surrounding the plenum throat and spaced forwardly therefrom to define a circular shoulder is a combustion block formed of refractory material and having a generally frusto-conical surface facing generally in the direction of the interior of the furnace. Extending through the housing is a fuel gas supply tube that is coaxial with the plenum throat and which supports a nozzle element and a distributor. The distributor extends radially outward toward the plenum throat to define therewith a relatively thin annular air passage.

The nozzle element has radially extending circumferentially inclined vanes that define, with the forward portion of the distributor, swirl producing slots which are adapted to receive air from the plenum through an annular air passage. The distributor and nozzle element define therebetween a fuel gas chamber that receives fuel gas through a supply tube and ports are provided between the slots and the chamber for introducing fuel gas from the supply tube into the slots in the nozzle to be mixed with air. The slots impart an angular velocity or swirl to the fuel-air mixture so that when the mixture exits the slots and is ignited it progresses radially outward with a spiral or swirling motion so that a large flat-flame is formed closely adjacent the frusto-conical surface of the combustion block.

The arrangement of the plenum throat, the distributor and the nozzle element is such that by readily effected modifications, which will be later described, the burner can be adapted for different gaseous fuels, such as natural gas, coke oven gas or butane, and the burner capacity or output may be increased or decreased.

DESCRIPTION OF THE PREFERRED EMBODIMENT

Figure 1:
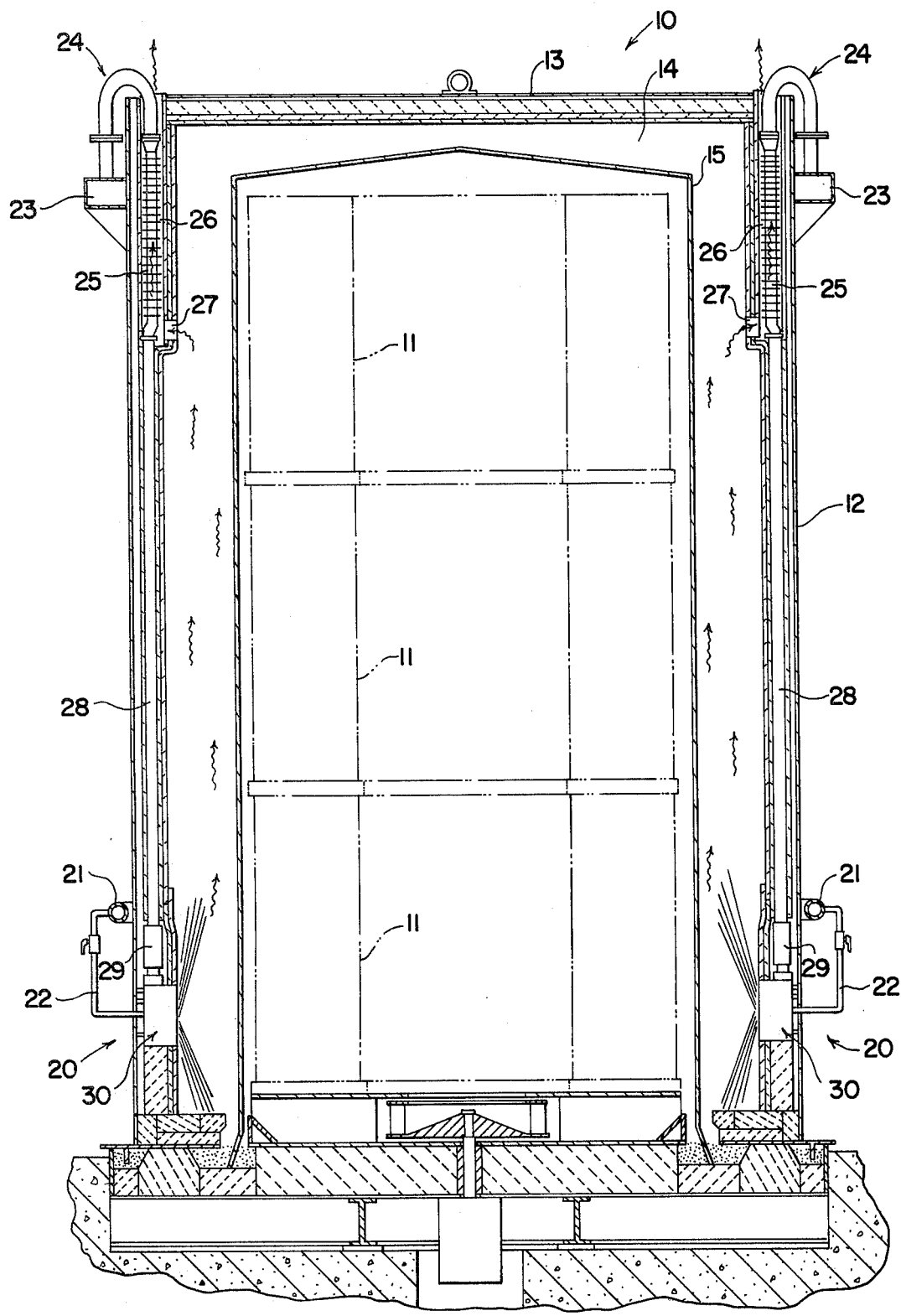
FIG. 1 is a central sectional view illustrating a heat treating furnace for annealing strip steel in coil form and including direct-fired flat-flame burner units embodying the present invention.
Figure 2:
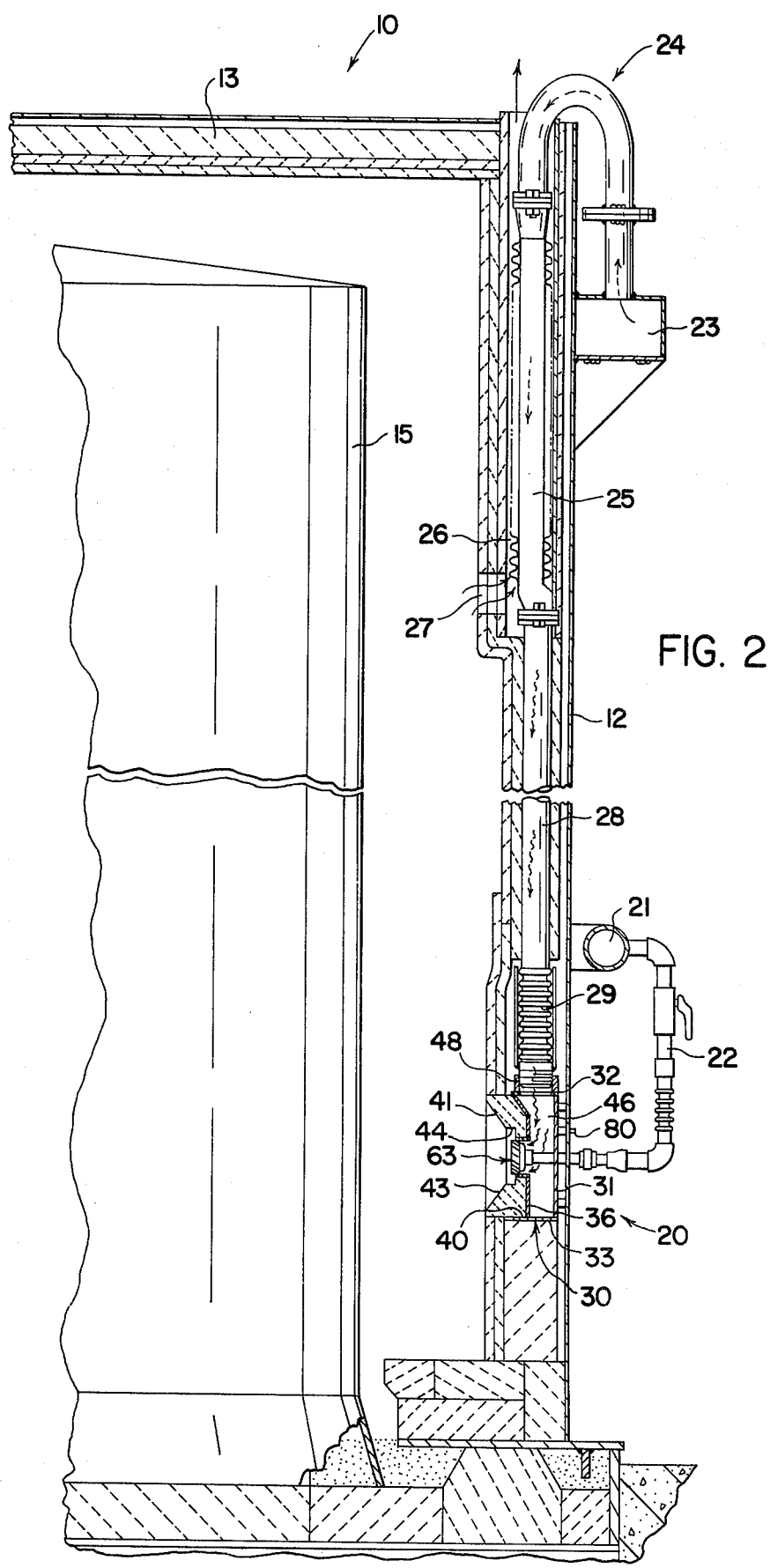
FIG. 2 is a fragmentary broken sectional view on an enlarged scale illustrating in more detail a portion of the heat treating furnace of FIG. 1.

Referring more particularly to the drawings and initially to FIGS. 1 and 2, there is shown a bell type annealing furnace 10 such as is extensively used for annealing coils 11 of strip steel. The furnace has an insulated cylindrical sidewall 12 and an insulated top 13 to define therein a heating chamber 14. Located within the heating chamber 14 is a removable inner cover 15 adapted to have a gas tight seal with the floor of the furnace to permit the introduction and maintenance of an inert gas atmosphere to prevent the adverse effects of oxidation during the annealing process.

In order to generate the heat required for the annealing operation, a plurality of flat-flame burner units 20 are mounted in circumferentially spaced relation in the cylindrical sidewall 12 of the furnace bell 10. The heat from these burners is effective directly against the outer wall of the inner cover 15. Surrounding the cylindrical furnace wall 12 is an annular fuel gas supply manifold 21 with spaced supply lines 22 for feeding fuel gas to the individual burner units 20.

Located near the upper portion of the furnace wall 12 is an annular air manifold 23 which supplies combustion air. For each of the burners, there is an air inlet pipe 24 connected to a recuperator 25 which extends through an exhaust passage 26 formed in the upper portion of the furnace wall 12. These passages 26 provide outlets for the products of combustion from the burners 20 which products enter the heating passages 26 through radial ports 27 in the furnace wall 12 and exit through openings at the upper end of the furnace. The gaseous combustion products as they move through the passages 26 heat the recuperators 25 and the combustion air passing therethrough. The preheated combustion air is then passed through the lower sections 28 of the air inlet tubes which extend downwardly to their respective burner unit 20. Each lower section 28 preferably has an expansion section 29 at the lower end to accommodate expansion and contraction caused by heating and cooling during the heat treating operation.

Referring now to FIGS. 3 to 7, each burner unit 20 has a rectangular housing 30 which includes a rear wall 31, top and bottom walls 32 and 33, sidewalls 34 and 35, a front wall 36 and two parallel vertical partition walls 37 and 38 positioned between the front wall 36 and rear wall 31. The front wall 36 has a cylindrical nozzle throat 39 extending forwardly therefrom to receive the various nozzle components to be described in more detail later. The front wall 36 is spaced behind the front edges of the top, bottom and side walls 32, 33, 34 and 35 so as to define therewith a rectangular recess 40 adapted to receive a refractory block 41 having a central circular opening 42 that fits around the cylindrical nozzle throat 39. It will be understood that the housing may, if desired, be cast rather than fabricated as illustrated in the drawings.

The refractory block 41 has a forwardly facing frusto-conical surface 43 and a circular recess forming a combustion ledge 44 concentric with the central opening 42 and defining, with the frusto-conical surface 43, an annular shoulder 45. The recess or ledge 44 extends into the path of the fuel-air mixture as it is discharged from the nozzle assembly and is very effective in the final mixing of the fuel-air mixture. The cone angle of the frusto-conical surface 43 is large enough that the flat-flame does not impinge thereon. This permits the flame to reach the largest possible diameter before completion of combustion. Also this minimizes the possibility of an undesirable hot spot effect on the wall of the inner cover 15.

Figure 3:
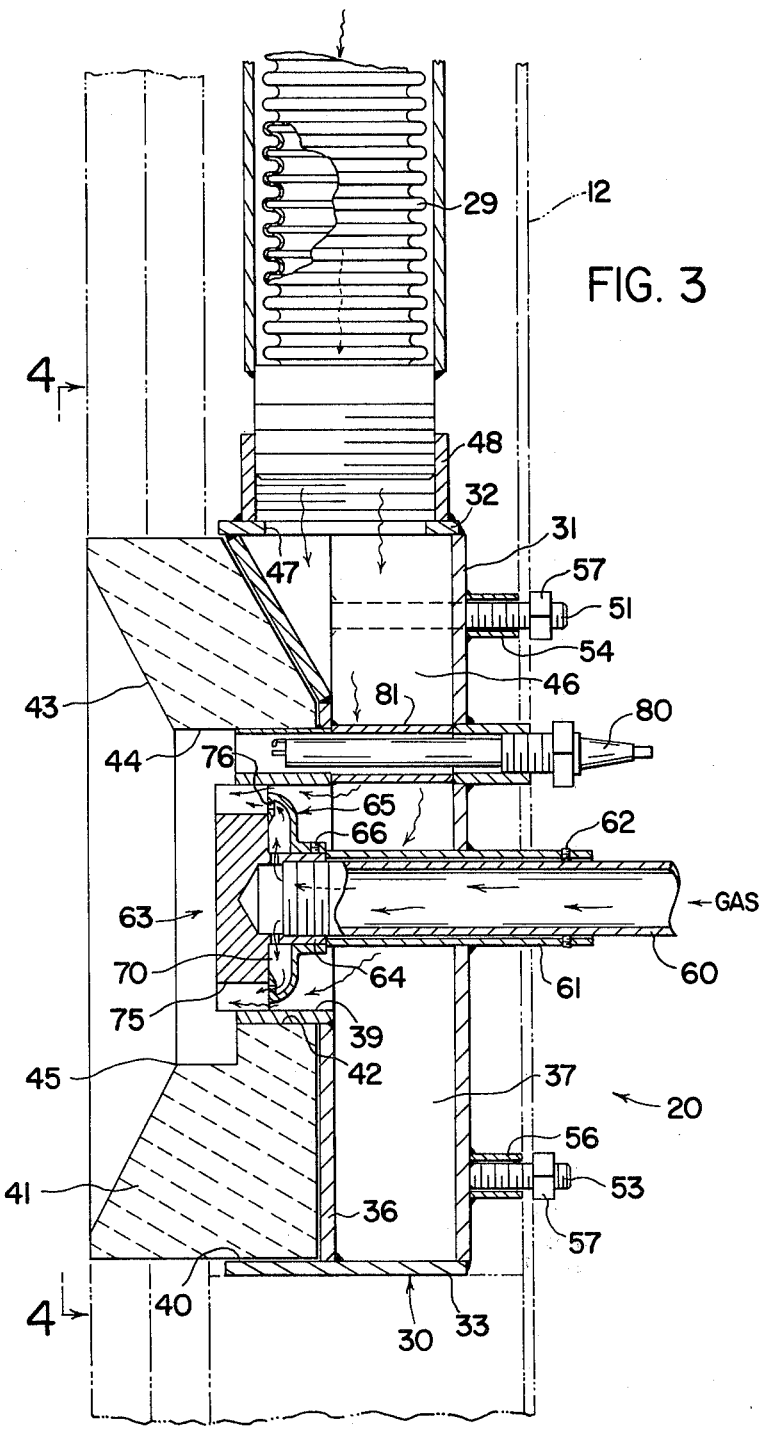
FIG. 3 is a fragmentary sectional view on a still larger scale taken on line 3—3 of FIG. 4 and illustrating a flat-flame burner embodying the invention and of the type shown in FIGS. 1 and 2.
Figure 4:
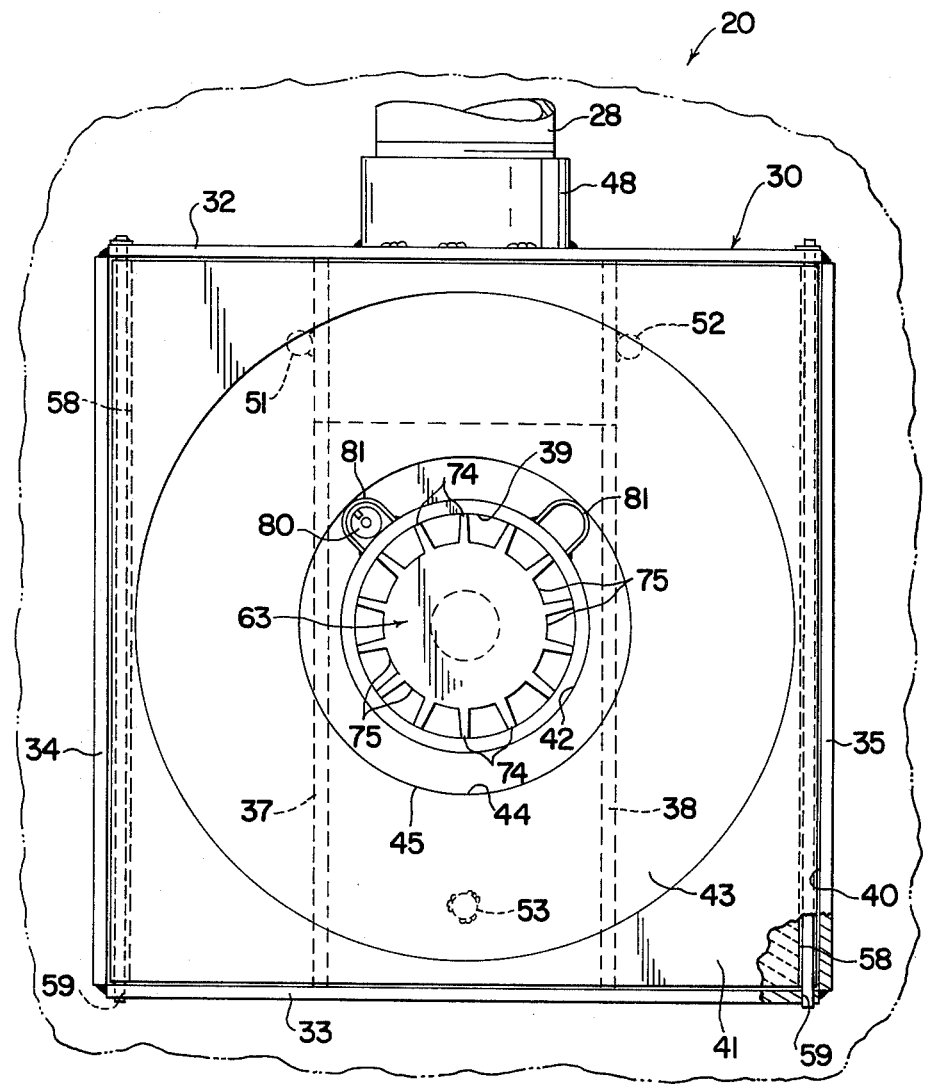
FIG. 4 is a front elevational view taken substantially on line 4—4 of FIG. 3.

The vertical partition walls 37 and 38 define with the top and bottom walls 32 and 33 and the front and rear walls 36 and 31, an air plenum 46 communicating with the nozzle throat 39. Air enters the air plenum 46 through an opening 47 in the top wall 32. An air inlet sleeve 48 extends from the top wall 32 around the opening 47 and provides a fitting to receive the lower section 28 of the air supply pipe 24 as best illustrated in FIG. 3. It will be understood that in some cases the air inlet to the plenum 46 may be modified as by locating it through the rear wall 31 or other convenient location.

Referring again to FIG. 3, it will be noted that the burner housing 30 is secured in the side wall of the furnace 10 by means of threaded mounting studs 51, 52 and 53. The housing 30 is spaced inwardly from the outside of the furnace wall 12 by means of spacer sleeves 54, 55 and 56 through which the mounting studs 51, 52 and 53 extend. The studs are secured to the wall 12 by nuts 57. This arrangement eliminates supporting the housing 30 on the refractory material of the furnace wall, thus facilitating the use of ceramic fiber insulation as the insulating material.

The refractory block 41 is retained in the housing 30 by a fastening arrangement including a groove 58 in the vertical sidewalls of the block 41 to provide a seat for key elements that are inserted through an elongated hole 59 formed in the walls 32 and 33. The keys are locked in place when the housing is positioned in the rectangular seat formed in the furnace wall 12.

A fuel gas inlet tube 60 extends through the housing 30 and is positioned within a guide sleeve 61 welded to and extending through the rear wall 31. The inlet tube 60 is adjustably locked to the sleeve with set screws 62 and has a threaded forward end adapted to receive a nozzle member 63 having a sleeve portion 64 with internal threads. On its outer surface the sleeve portion 64 receives a cup-shaped distributor 65 which is secured thereon as by the set screw 66. The distributor 65 has a curved radial flange portion 67 (see FIG. 5) that extends radially outward almost to the inner surface of the nozzle throat 39 to define with the throat an annular air passage 68 communicating with the air plenum 46. The distributor 65 also has an annular return flange 69 (see FIG. 6) against which the nozzle element 63 rests. The distributor 65 defines with the rearward face of the nozzle element 63 an annular fuel-gas chamber 70 into which fuel-gas is introduced from the inlet tube 60 through radial ports 71 formed in the sleeve portion 64 of the nozzle element 63. The nozzle element 63 has a plurality of radially extending helical vanes 73 and 74 that define therebetween swirl producing slots 75 (see FIGS. 5 and 7). Air enters each of the slots 75 through the annular passage 68 (FIGS. 3 and 6) while fuel gas enters each of the slots 75 through the ports 76 formed in the return flange 69 of the distributor 65.

Figure 5:
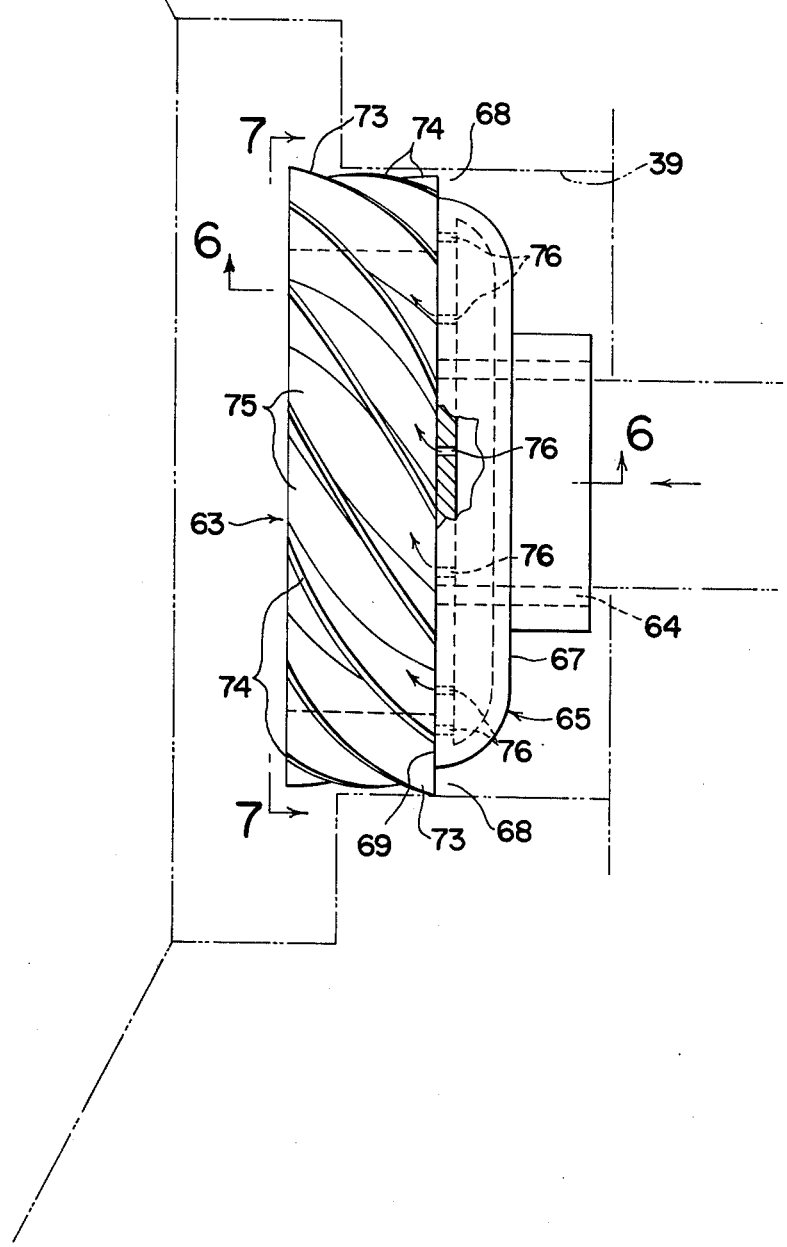
FIG. 5 is a side elevational view with parts broken away better to illustrate the nozzle element and distributor of the flat-flame gas burner of FIGS. 3 and 4.
Figure 6:
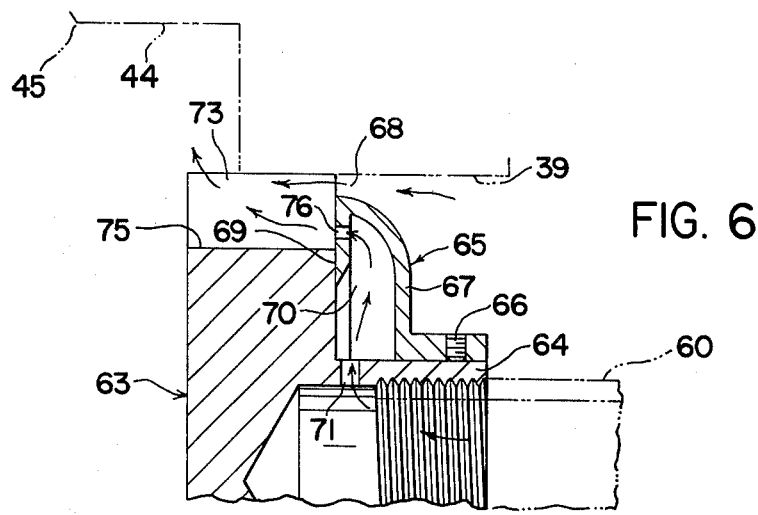
FIG. 6 is a fragmentary sectional view taken on the line 6—6 of FIG. 5.
Figure 7:
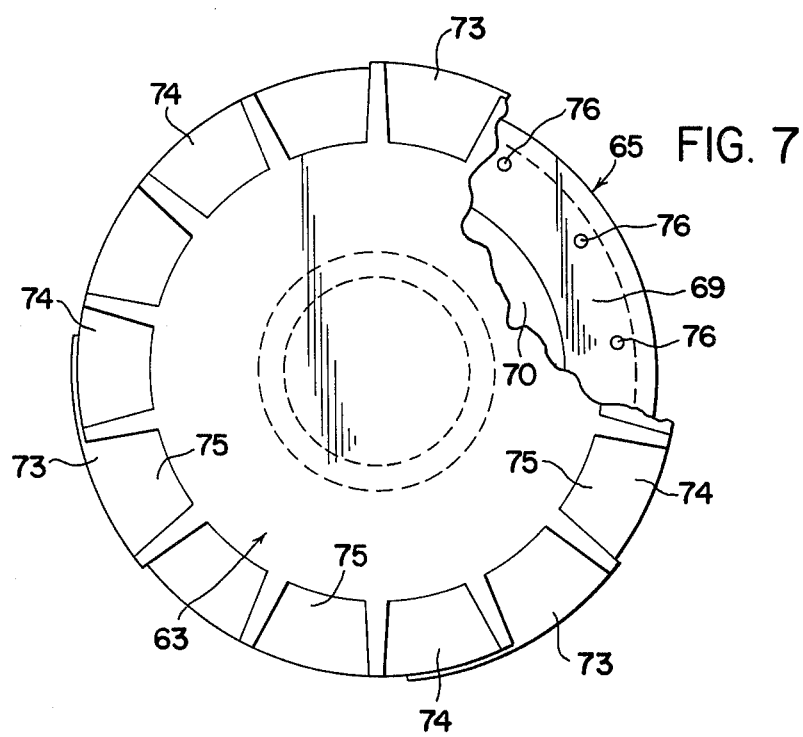
FIG. 7 is a front elevational view, with parts broken away, taken on the line 7—7 of FIG. 5.

The shape of the vanes 73 and 74 is illustrated in FIG. 5 and it will be noted that the air and gas which enter the slots 75 between the vanes 73 and 74 has a helical motion imparted thereto to develop a swirling and mixing effect as the gas and air move outward from the slots.

The three vanes 73 have a radial dimension slightly greater than the other vanes 74 so that the vanes 73 seat snugly within the plenum throat 39. With this construction, only the three vanes 73 need be accurately machined to provide a snug fit in the plenum throat 39, thus eliminating the necessity of machining the outer ends of the other vanes 74. The fuel gas and air that enter a slot 75 immediately begin to intermix to form a fuel-air mixture suitable for combustion. As the resulting mixture exits the slots 75 with a swirling motion, it is ignited using one or more ignitor plugs 80 mounted in tubes 81 (see FIGS. 3 and 4) that extend through the front and rear walls 36 and 31 respectively of the housing 30 and into the combustion zone forwardly of the nozzle assembly. The illustrated construction, including the combustion ledge 44, produces a flat-flame pattern that is closely adjacent the frusto-conical face 43 of the refractory block 41 and thus each burner heats a wide expanse of the inner cover 15.

Generally speaking, for a given burner capacity, a fixed quantity of combustion air is required regardless of the type of gaseous fuel utilized. The outside diameter of the distributor 65 can thus be fixed as related to a given burner capacity. Within this given burner capacity, alternate fuels can be utilized by providing a particular diameter for the several gas ports 76 in the distributor itself. For example, natural gas will require one diameter; and the use of coke oven gas, which has less B.T.U.'s per standard cubic foot, will require a larger gas port diameter for the same B.T.U.'s per hour. Similarly, the use of a propane gas, which has more B.T.U.'s per cubic foot than natural gas, will require a smaller gas port diameter. Thus, for a fixed burner capacity, the outside diameter of the distributor 65 would remain the same and alternate gaseous fuels could be accommodated by changing only the diameter of the several gas ports 76.

The burner capacity in B.T.U.'s per hour can be changed by increasing or decreasing the outside diameter of the distributor 65 and by a concurrent change in the diameter of the gas ports 76. For example, to increase the burner capacity, the outside diameter of the distributor 65 would be reduced to provide a greater area of the annular passage 68 through which the combustion air flows. With this increased air capacity, the diameter of the several gas ports 76 would be proportionally increased. Similarly, to decrease the burner capacity, the outside diameter of the distributor 65 would be increased and the diameter of the gas ports 76 would be decreased. From the above, it will be understood that changes of substantial degree can be made in the burner capacity, and concurrent or independent changes in type of fuel can be accommodated, by simple and inexpensive changes in the outside diameter of the distributor 65 and/or the size of the gas ports 76 in the distributor.

Further in view of the unique construction of the nozzle assembly it is possible to achieve a desired fuel-air mixture for optimum combustion through a wide range of fuel gas pressures and thus the burner unit 20 may be operated with optimum efficiency even though fuel gas pressure varies considerably.

While the invention has been shown and described with respect to a preferred embodiment thereof, this is intended for the purpose of illustration rather than limitation and variations and modifications of the specific construction herein shown and described will be apparent to those skilled in the art, all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. A fuel gas burner adapted for mounting in a furnace wall facing the interior of the furnace and comprising:
    an air inlet tube connected to said housing and having a section thereof extending through a portion of the wall of said furnace to heat air passing therethrough,
    a housing defining an air plenum communicating with said air inlet, and also defining a forwardly facing plenum throat,
    a combustion block formed of refractory material mounted in said housing surrounding said plenum throat and having a generally frusto-conical surface,
    a fuel gas supply tube extending into said plenum throat,
    distributor means mounted at the inner end of said supply tube and extending radially outward toward said plenum throat and defining therewith an annular air passage communicating with said plenum,
    a nozzle element mounted at the inner end of said gas supply tube and defining with said distributor means a fuel gas chamber communicating with and located around said gas supply tube, said nozzle element having radially extending, pitched circumferential vanes that define swirl producing slots adapted to receive air from said plenum through said annular passage,
    means for introducing fuel gas from said fuel gas chamber into said slots to be mixed with air, and
    means for igniting the resulting fuel-air mixture to produce a generally flat-flame extending radially outwardly adjacent said frusto-conical surface.

2. A fuel gas burner adapted for mounting in a furnace wall facing the interior of the furnace and comprising:
    a housing defining an air plenum communicating with an air inlet, and also defining a forwardly facing plenum throat,
    a combustion block formed of refractory material mounted in said housing surrounding said plenum throat and having a generally frusto-conical surface,
    a fuel gas supply tube extending into said plenum throat,
    an annular distributor mounted at the inner end of said supply tube and having a radial flange extending outward toward said plenum throat to define therewith an annular air passage communicating with said plenum, and also having a radial return flange spaced forwardly from said first named flange,
    a nozzle element mounted at the inner end of said gas supply tube and seated against said radial return flange to define with said distributor means a fuel gas chamber communicating with and located around said gas supply tube, said nozzle element having radially extending, pitched circumferential vanes that define swirl producing slots adapted to receive air from said plenum through said annular passage,
    means for introducing fuel gas from said fuel gas chamber into said slots to be mixed with air, and
    means for igniting the resulting fuel-air mixture to produce a generally flat-flame extending radially outwardly adjacent said frusto-conical surface.

3. A fuel gas burner as defined in claim 2 wherein said return flange has a plurality of circumferentially spaced ports formed therein and communicating with said slots.

4. A fuel gas burner as defined in claim 3 wherein one port is provided for each slot.

5. A fuel gas burner as defined in claim 2 wherein said combustion block has a central opening formed therein and through which said plenum throat extends and a concentric circular recess formed in the forward face of said block to define a combustion ledge located generally in the path of the fuel-air mixture projected from said slots.

* * * * *